Patented Mar. 19, 1929.

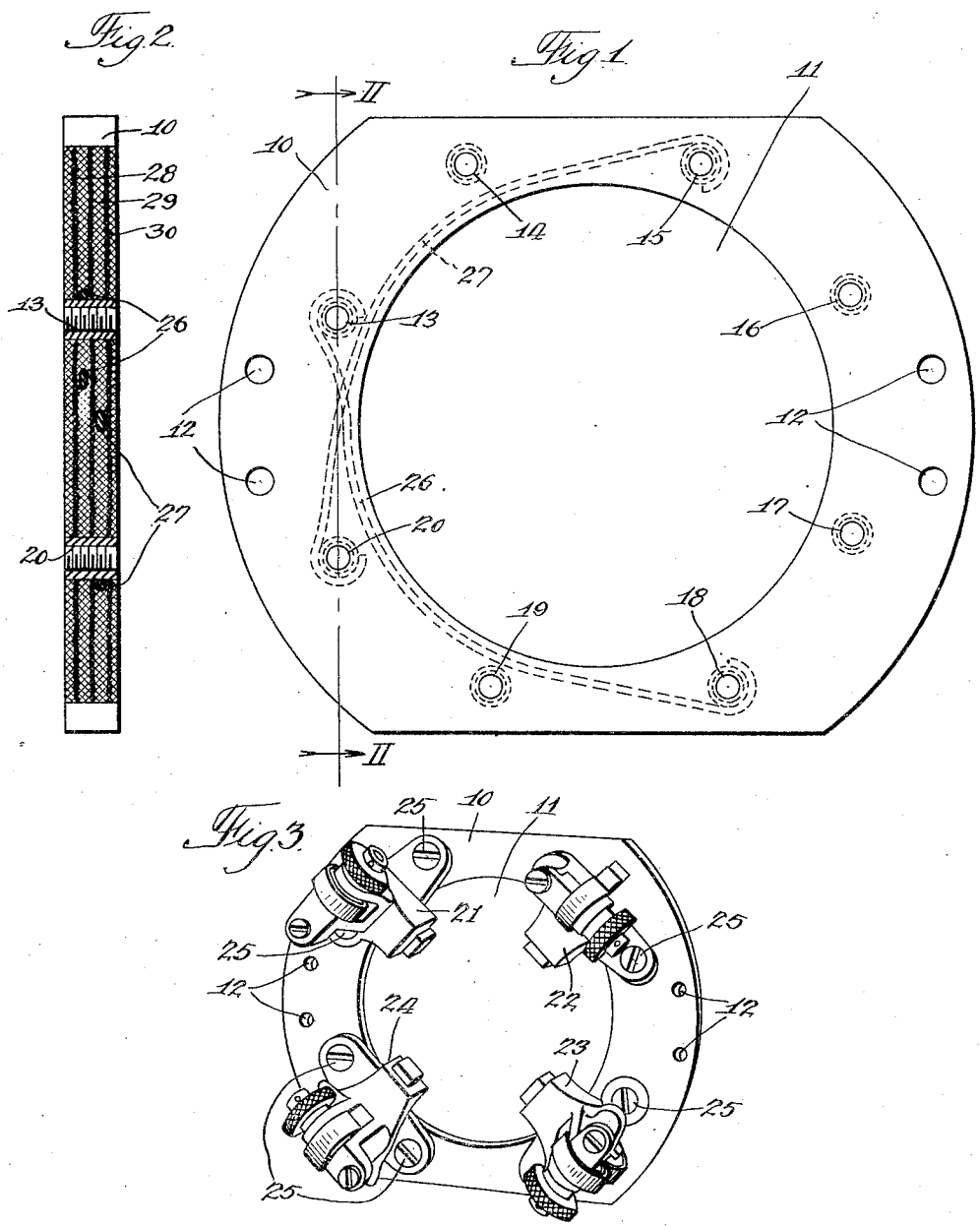

1,706,255

UNITED STATES PATENT OFFICE.

WILLIAM EDWARD RICHARD AND JOHN HENRY SCHROEDER, OF EVANSVILLE, INDIANA, ASSIGNORS TO SUNBEAM ELECTRIC MANUFACTURING COMPANY, OF EVANSVILLE, INDIANA, A CORPORATION OF INDIANA.

DYNAMO-ELECTRIC MACHINE.

Application filed August 24, 1927. Serial No. 215,210.

Our invention relates to dynamo-electric machines and has particular relation to devices for mounting brushes in dynamo-electric machines of the commutator type.

In the past it has been customary to utilize members of insulating material for supporting the brushes of dynamo-electric machines of the type referred to. In machines utilizing a plurality of pairs of interconnected brushes, electrical circuit connections have been made between brushes of like polarity by means of conductors extending loosely around the commutator externally of the brush-supporting member and connected to the holders of brushes of like polarity by means of binding posts or terminal screws. Such conductors are frequently broken or damaged by reason of their exposed condition, thereby causing failure of operation of the machine and, in some cases, causing injury to the machine.

The object of our invention is to provide a mounting device for dynamo-electric machine brushes wherein electrical circuit connection is established between brushes of like polarity without utilizing external conductors.

Our invention will be better understood by referring to the following detailed description in connection with the accompanying drawings, in which:

Figure 1 is a front elevational view of a brush-supporting device embodying our invention;

Fig. 2 is a vertical sectional view of the device shown in Fig. 1, taken along the line II—II of said figure; and Fig. 3 is a perspective view showing the device embodying our invention with a plurality of brushes operatively mounted thereon.

Referring to the drawings, a substantially flat annular member 10 of molded insulating material is provided with a centrally disposed aperture 11, through which the commutator of the machine with which the device is to be associated is adapted to extend. A plurality of apertures 12 are provided to receive bolts or screws for securing the member 10 in proper operative position within the machine.

Metallic inserts 13 to 20, inclusive, are molded in position within the member 10 and provide support for brush holders 21, 22, 23 and 24, which may be of conventional design. The brush holders are secured in position with respect to the annular member 10 by means of screws 25 that engage internally screw-threaded portions of the inserts 13—20. It will be seen that the brush holder 21 is secured to the inserts 13 and 14, the brush holder 22 to the inserts 15 and 16, the brush holder 23 to the inserts 17 and 18 and the brush holder 24 to the inserts 19 and 20.

The brush holders 21 and 23, being of like polarity, must be electrically connected and the brush holders 22 and 24, also being of like polarity, must be likewise connected. These connections are effected by means of conductors 26 and 27 that are embedded within the molded member 10. The conductor 26 is connected at one end thereof to the insert 13 and at the other end thereof to the insert 18, upon which inserts the brush holders 21 and 23, respectively, are mounted. The conductor 27 connects the inserts 15 and 20, which support the brush holders 22 and 24, respectively.

In order to insure perfect insulation of the conductors 26 and 27 with respect to each other and with respect to other parts of the machine, three layers 28, 29 and 30 of insulating fabric are also embedded within the molded member 10. The middle layer 29 is disposed between the two conductors 26 and 27 and the outer layers 28 and 30 are disposed between the conductors 26 and 27, respectively, and the adjacent outer surfaces of the member 10. The provision of the fabric layers 28, 29 and 30 also increases the mechanical strength of the member 10, which constitutes an additional advantage in utilizing this method of construction.

It will be seen that the utilization of my invention permits the elimination of all external connecting wires between brushes of like polarity in a dynamo-electric machine, which not only renders the machine less subject to failure or damage, but also facilitates assembly and maintenance of the machine and reduces the number of parts utilized in the construction thereof.

While we have shown our invention as applied to a dynamo-electric machine utilizing only two brushes in each set, it will be apparent to those skilled in the art that the invention is equally adaptable to machines wherein each set of brushes comprises a greater number of individual brushes. It will also be seen that various other modifications and changes may be made in the particular embodiment of our invention herein illustrated and described, without departing from the spirit and scope of our invention, as set forth in the appended claims.

We claim as our invention:

1. A device for mounting a plurality of sets of brushes for a dynamo-electric machine comprising an annular member of molded insulating material including inserts of conducting material, brush-holders secured to said annular member in electrical conducting relation to said inserts, conductors for establishing electric circuit connection between certain of said inserts and a layer of insulating fabric between said conductors.

2. A device for mounting a plurality of sets of brushes for a dynamo-electric machine comprising a molded insulating member of substantially flat annular form including a plurality of internally screw-threaded metallic inserts, brush-holders secured to said insulating member in electrical conducting relation to said inserts, a plurality of conductors embedded in said molded member for establishing electrical circuit connection between certain of said inserts, and a plurality of substantially flat spaced layers of insulating fabric disposed within said molded member for separating said conductors one from another and from the flat surfaces of said molded member.

3. A device for mounting two pairs of brushes for a dynamo-electric machine comprising a molded insulating member of substantially flat annular form including a plurality of internally screw-threaded metallic inserts, holders for the brushes severally secured to said insulating member through the medium of said inserts and in electrical conducting relation to the latter, two conductors embedded in said molded member for establishing electrical circuit connection between the inserts for supporting the two brushes of each pair and three sustantially flat layers of insulating fabric embedded in said molded member, the middle one of said layers being disposed between said two conductors and the other two of said layers being respectively disposed between one of said conductors and the adjacent outer surface of said molded member.

In witness whereof, we have hereunto subscribed our names.

WILLIAM EDWARD RICHARD.
JOHN HENRY SCHROEDER.